May 10, 1955 W. F. TIPPING 2,708,231
ELECTRIC WATER HEATERS
Filed July 20, 1951 3 Sheets-Sheet 1
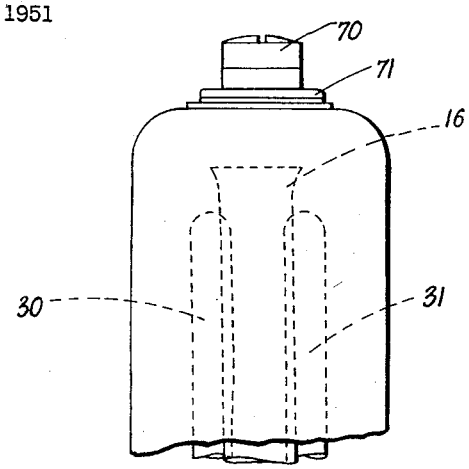
Fig. 1.
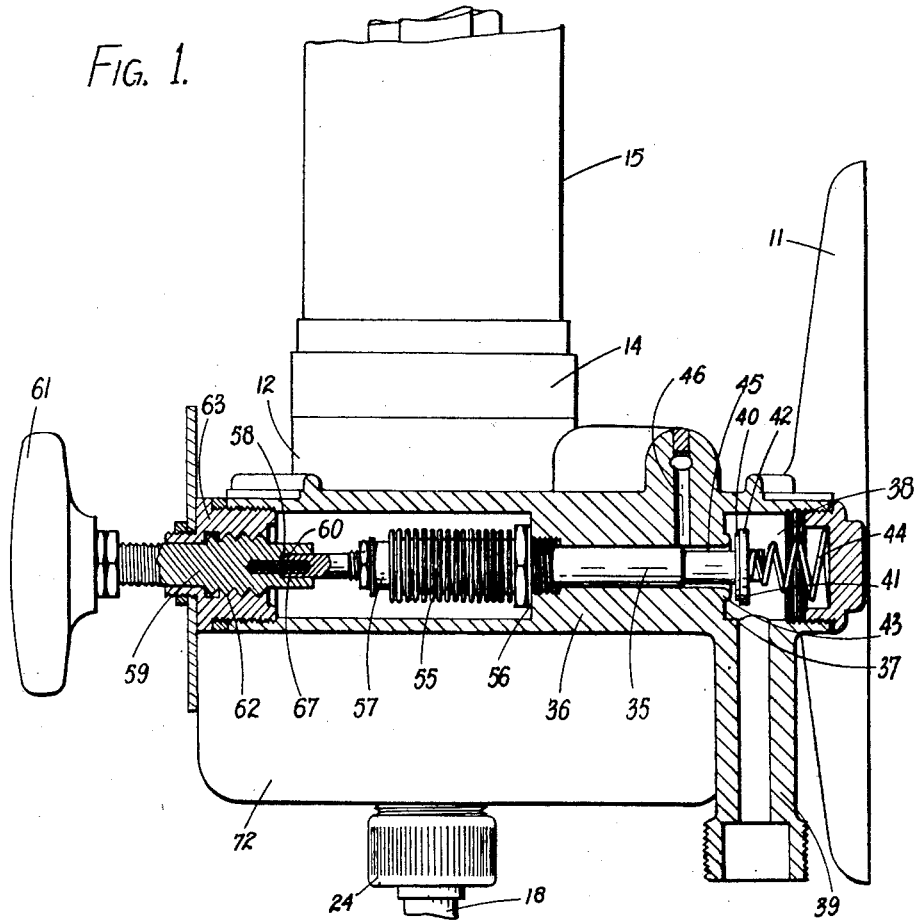
INVENTOR:
William F. Tipping
BY:
Watson, Cole, Grindle & Watson
ATTORNEY:

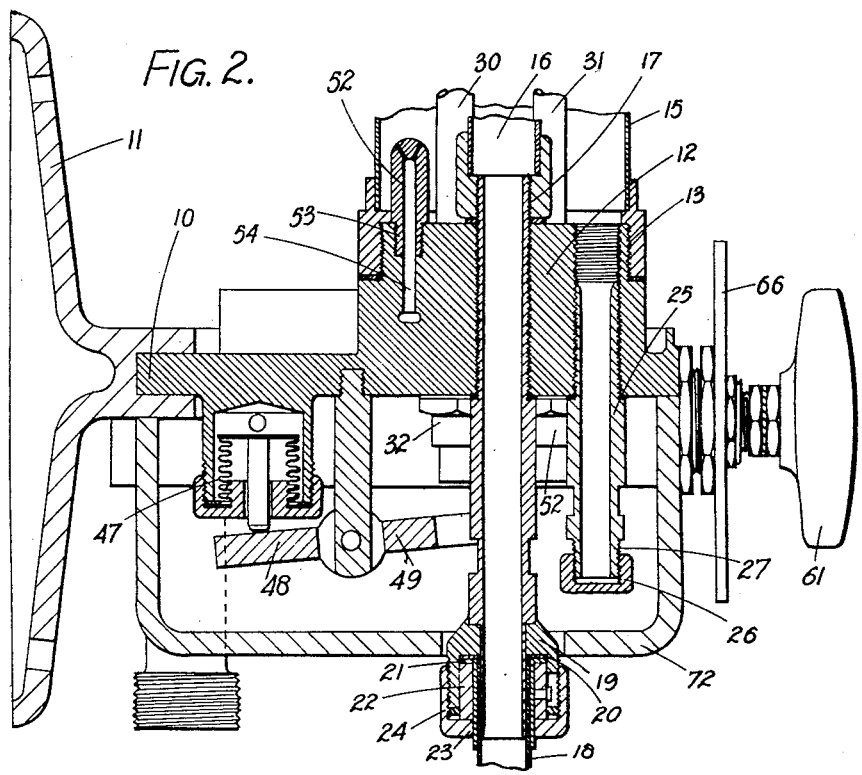
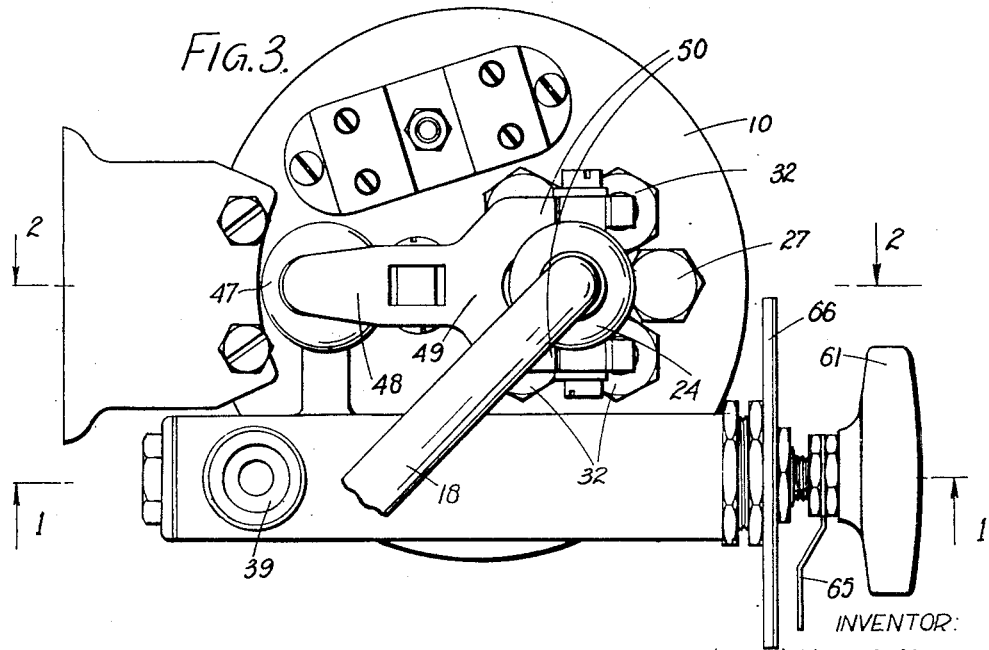

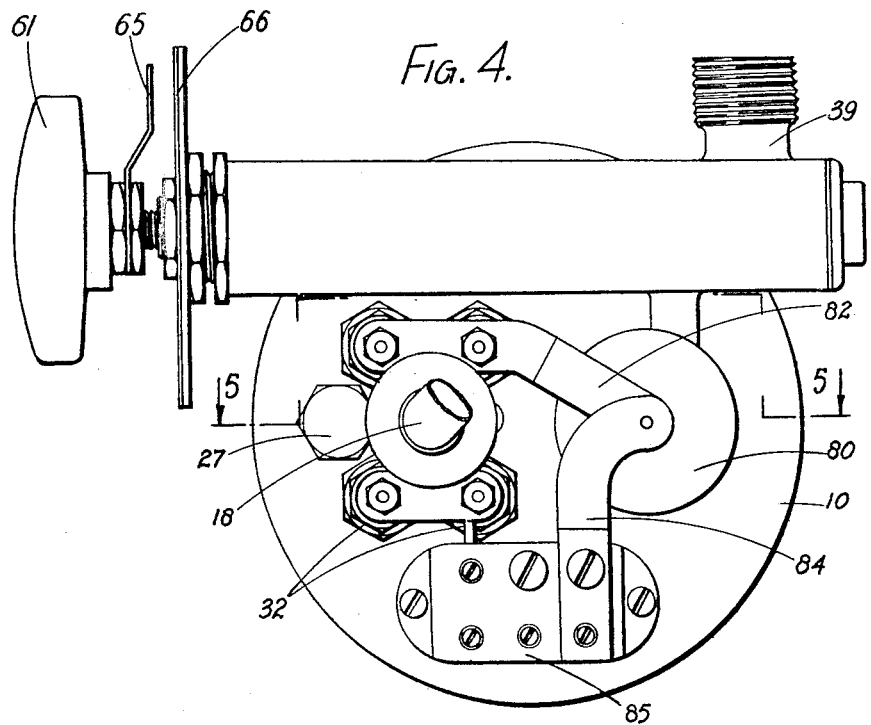
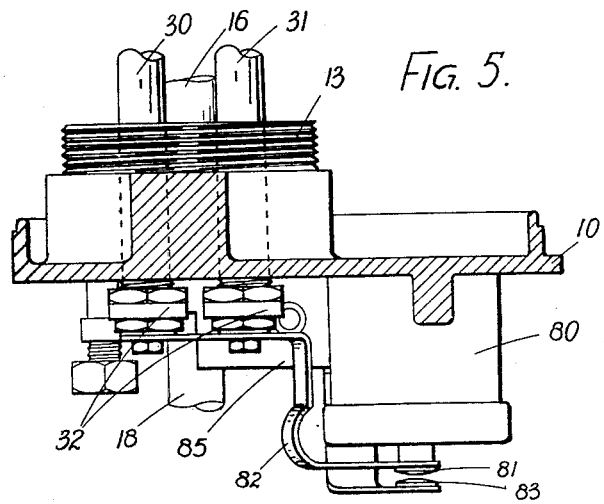

United States Patent Office 2,708,231
Patented May 10, 1955

2,708,231

ELECTRIC WATER HEATERS

William Frederick Tipping, Chislehurst, England

Application July 20, 1951, Serial No. 237,734

Claims priority, application Great Britain March 1, 1951

7 Claims. (Cl. 219—39)

This invention relates to electric water heaters of the kind in which the water is arranged to flow past a heating element at a rate such that it issues from the heater at the required temperature in a steady stream.

It will be understood that in such heaters, the rate of flow of the water is determined by the amount of heat available from the heating element and the required rise in temperature. Thus, if a three kilowatt heating element is used and the temperature is to be raised from an average room temperature to approximately boiling point, then the flow has to be regulated to about one U. S. pint per minute. If the flow were any faster, the rise in temperature of the water would be less. It has been the usual practice heretofore to provide a valve which, when opened, admits water at the required rate into a narrow tube or passage alongside the heating element and leading directly to the outlet. The tube or passage in such a construction must necessarily be of small section to ensure that the water flows only slowly past the heating element and has sufficient time to be heated before it reaches the outlet. In such an arrangement, however, the furring which occurs soon blocks the narrow section so that the heater has to be frequently dismantled for cleaning the passages.

Also, in such heaters, it is the practice to couple the electrical switch for the heating elements to the valve controlling the water flow so that the elements are energised only when the valve is turned on. In such an arrangement, however, if the water supply should fail the elements will remain energised and are therefore liable to be damaged by overheating.

It is an object of the present invention to provide an improved form of electric water heater and more particularly to provide a heater in which there is no possibility of the elements remaining energised if the water supply should fail.

It is a further object of the invention to provide a heater in which the effects of furring are minimized and which can readily be dismantled for cleaning if necessary.

According to this invention, an electric water heater comprises a water container, inlet and outlet means for passing water into and out of the container at a required rate of flow, one or more electrical heating elements for heating the water in the container, a switch in the electrical circuit for the heating element or elements and means responsive to the flow of water arranged to operate the switch so that the element or elements are energised only when water is flowing through the container. Thus the element or elements are switched off if there should be any interruption of the water supply.

According to a further feature of the invention, an electric water heater comprises a water container surrounding a straight upright outlet tube extending nearly to the top of the container, the upper end of which tube is open to the container, means for passing water into the container at the required rate of flow and one or more heating elements for heating the water in the container. With this form of construction the container will remain filled with water when the flow is stopped and can be sufficiently large to prevent rapid furring yet the water will still flow past the heating element or elements at the required slow rate. For example, using a three kilowatt heating element, a container having a capacity of about one pint may conveniently be employed. Furthermore, this arrangement of a straight outlet tube and surrounding container enables the heater to be made in a form which can be readily dismantled for removal of fur.

In a preferred form of construction the outlet tube and heating elements are mounted on a base and the container is in the form of an open-ended vessel the open end of which is adapted to fit over the outlet tube and heating elements and to be water-tightly secured to the base. For example, the vessel may be secured by a threaded collar to an upstanding threaded portion of the base. Thus the vessel may readily be detached from the base for removal of fur.

The following is a description of two embodiments of the invention, reference being made to the accompanying drawings, in which:

Figure 1 is a view of one form of water heater in sectional elevation along the line 1—1 of Figure 3;

Figure 2 is a part of a sectional elevation of the heater along the line 2—2 of Figure 3;

Figure 3 is a plan view looking at the underside of the heater of Figures 1 and 2, with the lower cover removed;

Figure 4 is a view similar to Figure 3 of a modified form of construction; and

Figure 5 is a sectional elevation of the base of the heater of Figure 4 along the line 5—5 of Figure 4.

Referring to Figures 1, 2 and 3, there is illustrated a domestic water heater having a base 10 clamped to a bracket 11 by which the assembly can be mounted on a wall. On this base is a raised circular portion 12 (Figure 2) having an external thread 13 adapted to engage a collar 14 which forms a rim around the bottom open end of an upright cylindrical vessel 15 about 12 inches long and about two inches in diameter, which vessel is closed at the top. Mounted on the base 10 and extending upwards in the vessel 15 along the axis thereof to a point near the top is an upright tube 16 about half-an-inch in diameter, which tube is open at its upper end to form an overflow outlet for the annular part of the vessel 15. This inner tube 16 at its lower end leads into a tube 17 passing through a gland in the base 10 and the lower end of tube 17 is connected to a swan-neck outlet tube 18, that is to say a tube having two bends at right-angles in opposite directions. This outlet tube 18 is rotatable about the tube 17 and, for this purpose, an externally threaded bush 19 is secured to the end of the tube 17, the bush at its lower end having an internal diameter larger than the external diameter of the tube 17 to leave an annular space which extends axially for about half-an-inch from the end of the tube 17. In the bottom of this annular space is a rubber washer 20. The upper end of the outlet tube 18 is secured in a short cylindrical member having an outwarly-directed flange 21 and is so dimensioned that the flange can be inserted into the annular space with the flange 21 bearing against the washer 20. A metal washer 22 is arranged in the annular space below the flange 21 and is held in position by an inwardly-directed flange 23 of a collar 24 which surrounds the outlet tube 18 and which engages the threaded portion of the bush 19. By this construction the outlet tube 18 can be rotated about the inner tube 17 without any tendency for the collar 24 to work loose on the bush 19.

Also extending through the base 10 from the vessel 15 is a drainage tube 25, the lower end of which is normally sealed by a cap 26 which engages the threaded end 27 of the tube 25.

Disposed inside the vessel 15 immediately adjacent the inner tube 16 and on opposite sides thereof are two inverted U-shaped electrical heating elements 30, 31. These elements are mounted in the base 10 and the electrical connections are led through the base to terminals 32 on the underside thereof, suitable glands (not shown) being provided in the mountings to prevent any leakage of water. The elements 30, 31 extend above the base 10 for substantially the full length of the tube 16 and are of the known rod type comprising an external metal tube with a calcium chloride packing. It has been found that elements having a total heating capacity of three kilowatts are suitable for a heater having the dimensions previously mentioned.

To control water supply to the annular part of the vessel 15, there is mounted on the base a valve which is most clearly shown in Figure 1 and which has a shaft 35 axially movable in a body part 36 formed integrally with the base 10. One end of the shaft 35 extends through a face 37 of the body part into an inlet chamber 38 which is provided with a pipe 39 arranged for connection to a water supply. On the protruding portion of this end of the shaft 35 is mounted a rubber washer 40 which fits in a cup-shaped washer housing 41 bolted to the end of the shaft 35. The washer housing 41 has a rim 42 extending axially of the shaft 35 towards the face 37 and serves to prevent the washer 40 from being deformed when it is pressed against a seating portion 43 formed on the face 37. A spring 44 is arranged in the inlet chamber 38 to press the shaft 35 axially in the direction to keep the washer 40 against the seating portion 43.

For a short distance extending from the washer 40, the shaft 35 is of reduced diameter to provide an annular passage 45 between the shaft 35 and body portion 36 into which water will flow when the washer 41 is moved away from the seating portion 43. An outlet port 46 is arranged in the body portion 36 open to the annular passage 45 through the full range of axial movement of the shaft 35 and this outlet port communicates with a pressure bellows 47 (Figure 2) which are connected to one arm 48 of a pivoted switch member 49. The bellows 47 and switch member 49 are so arranged that when the water supply pressure is applied through port 46 to the outside of the bellows 47, a pair of electrically-connected switch contacts on arms 50 of the switch member bridge a co-operating pair of contacts on terminals 32 to complete the electrical circuit for the heating elements 30, 31. When the pressure is removed from the bellows 47, they expand and so open the circuit for the heating elements.

The annular passage 45 and the outlet port 46 are so arranged that when the shaft 35 is initially moved to admit water from the chamber 38 into the passage 45, the outlet port is fully open but further axial movement of the shaft 35 gradually moves the larger diameter part of the shaft across the outlet to reduce the flow through the port. This outlet port 46 is also connected by a passage through the base 10 to a diffuser 52 (Figure 2) located in the bottom of the annular portion of the vessel 15, the diffuser having a threaded portion 53 which engages the tapped end of the water passage 54 in the base 10 so that the diffuser can readily be removed for cleaning when necessary.

A watertight seal between the valve body portion 36 and the shaft 35 at the end remote from the inlet chamber 38 is provided by means of a flexible bellows 55 surrounding the shaft 35 near this end. One end of the bellows 55 is secured by means of a bush 56 to the valve body 36 and the other end of the bellows is sealed to a bush 57 on the shaft 35. The end of the shaft protruding through the bush 57 fits into an axial bore 58 in one end of a spindle 59 and engages a shoulder 60 therein. On the other end of the spindle 59 is a control knob 61. The spindle 59 is externally threaded with a double start thread 62 engaging a bush 63 which is secured to the valve body 36 so that axial movement of the spindle 59 and shaft 35 is obtained by rotation of the control knob 61, the double start thread giving a substantial axial movement for a rotation of the control knob 61 through 180 degrees. The bush 63 is arranged so that the axial movement of the spindle 59 is limited to a distance corresponding to 180 degrees of rotation. The outlet port 46 of the valve is so positioned and dimensioned that when the knob 61 is turned to move the shaft 35 to its innermost position which gives the minimum flow of water, the flow through the port 46 is such that the water is heated to boiling point. The maximum flow of water is determined by the maximum port opening and is arranged to give a suitable minimum temperature, for example 145° F. A pointer 65 (Figure 3) is secured on the knob 61 to traverse a semi-circular scale 66 which is marked to indicate the temperature. It will be seen that at the lower temperature end of the range, the flow would be completely stopped as soon as the washer 41 seats against the seating face 43 but, as soon as the washer is moved away from this seating face, the rate of flow is determined by the outlet port, the flow being reduced as the control knob 61 is turned away from the off position. To enable the washer 41 to seat properly on its seating face 43 without play on the control knob 61, a light spring 67 is provided on the bore 58 between the end of the shaft 35 and the spindle 59 so that any axial play between the shaft 35 and spindle 59 is taken up when the spindle 59 is rotated beyond the position at which the washer 41 is seated on the face 43.

It will be seen that with this arrangement, the control knob 61 controls the rate of flow of water and thus the temperature. Only when the knob has been turned to permit water to flow into the port 46 will the pressure bellows 47 operate to switch on the current to the heating elements 30, 31. If the flow is shut off by the valve or if the supply fails for any reason, no pressure will be applied to the bellows and the current will be cut off. This ensures that there is no possibility of the heating elements being energised without water in the vessel 15. However, as a further safety precaution, a safety device 70 is provided in the top of the vessel 15. This safety device is of the kind having a part designed to rupture if any excessive steam pressure is built up in the vessel 15. For convenience, the safety device is made as a unit which is fitted in a threaded bush 71 in the top of the vessel. Thus the safety device can be readily removed and replaced if necessary and this also provides a convenient means for obtaining access to the vessel 15 such as is required, for example, if a fur removing chemical is to be put into the vessel.

It will be noted that the bellows 47 are responsive to the pressure in the outlet port. The full pressure of the water supply is applied to the bellows irrespective of the amount of opening of the valve.

It will also be seen that the particular construction of the vessel 15 and its inner tube 16 greatly facilitates dismantling for cleaning. The cylindrical container 15 can readily be removed simply by unscrewing it from the base 10 to which it is attached by the threaded collar 14. All the other components are mounted on the base 10 so that they do not interfere with the removal of the container 15. These other components, such as the diffuser 52 and the inner tube 16, are likewise readily removable by unscrewing from the base 10.

The whole of the container 15 and other structure above the base may, if desired, be enclosed by a cylindrical cover member (not shown) which fits onto the base 10; such a cover member provides a convenient support for an indicator lamp which may be connected to the aforementioned switch contacts to indicate whether or not the heating elements are energised. Similarly, a cover member 72 may be provided below the base 10 to enclose the pressure bellows 47 and switch assembly.

Figures 4 and 5 illustrate a modification of the heater of Figures 1–3, the arrangement shown in Figures 4 and 5 being designed to operate with very low pressure water supplies, for example, with a head of only a few feet. The general construction of the heater of Figures 4 and 5 is identical with that of Figures 1–3 and it is only necessary to refer to the differences in the construction. Because of the low available head for the switch operating bellows, the bellows 80 is rather larger than the corresponding bellows in Figures 1–3. On the end of the bellows 80 is mounted a switch contact 81 which is electrically connected by a flexible metal strip 82 to one pair of the terminals 32. A co-operating switch contact 83 is provided on a fixed metal arm 84 mounted on a terminal block 85. At this terminal block, the arm 84 is connected to one side of the supply mains, the other side of which is connected to the second pair of terminals 32. Thus, the movement of the bellows 80 serves to open and close the electrical circuit for the heating elements.

Apart from the bellows and switch assembly, the construction and operation of the heater shown in Figures 4 and 5 is similar to that of Figures 1–3.

I claim:

1. An electric water heater comprising a water container, inlet and outlet means for passing water into and out of the container, at least one electrical heating element for heating the water in the container, a switch in the electrical circuit for said heating element, means responsive to the flow of water arranged to operate the switch so that said element is energized only when water is flowing through the container and an adjustable valve having a single manual control for regulating the rate of flow of water through said container, which valve has both sealing means for stopping the water flow and control means for controlling the rate of flow mechanically interconnected to be operable by said single manual control so that, as the sealing means is opened to permit water to flow into the container, the control means permits maximum flow but further movement of the manual control operates the control means to reduce the rate of flow.

2. An electric water heater according to claim 1, wherein said responsive means comprises a pressure responsive bellows.

3. An electric water heater according to claim 1, wherein said valve is arranged to apply the full pressure of water at the valve inlet, to the pressure responsive means independently of the rate of flow of water into the container.

4. An electric water heater comprising a water container; an inlet pipe for passing water into the container; an outlet for passing water out of the container; at least one electrical heating element for heating the water in the container; a switch in the electrical circuit for said heating element; pressure responsive means adapted to operate said switch to energise the heating element when pressure is applied to the responsive means; a valve in said inlet pipe having an outlet port, a movable control member, a body portion, cooperating seating faces on said control member and body portion for controlling the passage of water to the outlet port and means on said control member for so adjusting the opening of the outlet port in accordance with the position of the control member that when the control member is moved to admit water to the outlet port the aperture of the port is firstly at a maximum and is subsequently reduced by further movement of the control member; and means connecting the outlet port to the pressure responsive means.

5. An electric water heater according to claim 4 wherein said valve comprises a body portion having an outlet port; a shaft axially adjustable in said body portion and having at least one axial passage; and a seating member on the end of the shaft with a cooperating seating face on said body portion arranged so that movement of the seating member away from the seating face admits water into said axial passage, the outlet port and the axial passage being arranged so that movement of the shaft in the direction which moves the seating member away from the seating face gradually reduces the flow through the outlet port.

6. An electric water heater comprising a water container; a straight upright outlet tube extending inside said container nearly to the top thereof, the upper end of which tube is open to the container; inlet means including an adjustable regulator for passing water into the container at a regulatable required rate of flow; at least one electrical heating element for heating the water in the container; a switch in the electrical circuit for said heating element and means responsive to the flow of water into the container arranged to operate the switch so that said element is energised only when water is flowing through the container.

7. An electric water heater comprising a water container; a straight upright outlet tube extending inside said container nearly to the top thereof, the upper end of which tube is open to the container; an inlet for passing water into the container; at least one electrical heating element for heating the water in the container; a switch in the electrical circuit for said heating element; pressure responsive means responsive to the water pressure in the inlet and arranged to operate said switch so that said element is energised only when pressure is applied to the responsive means; and a valve in said inlet for adjustably regulating the flow into the container and for simultaneously controlling the application of water pressure to the responsive means.

References Cited in the file of this patent

UNITED STATES PATENTS

| | | |
|---|---|---|
| 1,053,550 | Wright et al. | Feb. 18, 1913 |
| 1,079,185 | Polak | Nov. 18, 1913 |
| 1,554,502 | Hulse | Sept. 22, 1925 |
| 2,325,722 | Walther | Aug. 3, 1943 |
| 2,347,122 | Peet | Apr. 18, 1944 |
| 2,355,687 | Van Hise | Aug. 15, 1944 |